United States Patent
Dey (10) Patent No.: US 8,966,638 B2
(45) Date of Patent: Feb. 24, 2015

(54) SYSTEM, METHOD, AND COMPUTER PROGRAM PRODUCT FOR SELECTING A WIRELESS NETWORK BASED ON SECURITY INFORMATION

(71) Applicant: McAfee Inc., Santa Clara, CA (US)

(72) Inventor: Sankha S. Dey, Bangalore (IN)

(73) Assignee: McAfee, Inc., Santa Clara, CA (US)

( * ) Notice: Subject to any disclaimer, the term of this patent is extended or adjusted under 35 U.S.C. 154(b) by 0 days.

(21) Appl. No.: 13/974,188

(22) Filed: Aug. 23, 2013

(65) Prior Publication Data

US 2013/0346602 A1     Dec. 26, 2013

Related U.S. Application Data

(63) Continuation of application No. 11/970,429, filed on Jan. 7, 2008, now Pat. No. 8,572,745.

(51) Int. Cl.
G06F 21/00      (2013.01)
H04L 12/26      (2006.01)

(52) U.S. Cl.
CPC .............. *H04L 43/04* (2013.01); *G06F 21/00* (2013.01)
USPC ................. 726/25; 726/22; 726/23; 726/24; 726/27; 726/28; 726/29; 726/30; 713/187; 713/188; 713/193; 713/194

(58) Field of Classification Search
USPC ............... 726/27–30, 22–25; 713/187–188, 713/193–194
See application file for complete search history.

(56) References Cited

U.S. PATENT DOCUMENTS

| | | | |
|---|---|---|---|
| 5,987,610 A | 11/1999 | Franczek et al. | |
| 6,073,142 A | 6/2000 | Geiger et al. | |
| 6,460,050 B1 | 10/2002 | Pace et al. | |
| 6,801,777 B2 | 10/2004 | Rusch | |
| 7,171,216 B1* | 1/2007 | Choksi | 455/456.1 |
| 7,225,468 B2 | 5/2007 | Waisman et al. | |
| 7,257,630 B2* | 8/2007 | Cole et al. | 709/224 |
| 7,359,676 B2 | 4/2008 | Hrastar | |
| 7,506,155 B1 | 3/2009 | Stewart et al. | |
| 7,590,708 B2 | 9/2009 | Hsu | |
| 7,639,816 B2 | 12/2009 | Nakagomi et al. | |
| 7,797,738 B1 | 9/2010 | Spatscheck et al. | |
| 7,949,329 B2 | 5/2011 | Benco et al. | |
| 8,225,394 B2* | 7/2012 | Gassoway | 726/22 |
| 2006/0075103 A1 | 4/2006 | Cromer et al. | |
| 2006/0092890 A1 | 5/2006 | Gupta et al. | |
| 2007/0180528 A1* | 8/2007 | Kane | 726/24 |
| 2007/0217371 A1 | 9/2007 | Sinha | |

OTHER PUBLICATIONS

Non-Final Office Action received for the U.S. Appl. No. 11/970,429, mailed on Oct. 28, 2010.

(Continued)

*Primary Examiner* — Josnel Jeudy
(74) *Attorney, Agent, or Firm* — Patent Capital Group (57) ABSTRACT

A system, method, and computer program product are provided for selecting a wireless network based on security information. In use, a plurality of wireless networks is identified. Further, security information associated with each of the wireless networks is collected, such that one of the wireless networks is selected based on the security information.

24 Claims, 9 Drawing Sheets

(56) References Cited

OTHER PUBLICATIONS

Amendments/Arguments filed on Feb. 24, 2011 in Response to Non-Final Office Action dated Oct. 28, 2010, received for the U.S. Appl. No. 11/970,429.

Final Office Action received for the U.S. Appl. No. 11/970,429, mailed on May 11, 2011.

RCE & Amendment filed on Aug. 11, 2011 in response to the Final Office Action dated May 11, 2011, received for the U.S. Appl. No. 11/970,429.

Non-Final Office Action received for the U.S. Appl. No. 11/970,429, mailed on Sep. 29, 2011.

Amendments/Arguments filed on Dec. 24, 2011 in Response to Non-Final Office Action dated Sep. 29, 2011, received for the U.S. Appl. No. 11/970,429.

Final Office Action received for the U.S. Appl. No. 11/970,429, mailed on Mar. 9, 2012.

RCE & Amendment filed on May 9, 2012 in response to the Final Office Action dated Mar. 9, 2012, received for the U.S. Appl. No. 11/970,429.

Notice of Allowance received for the U.S. Appl. No. 11/970,429, mailed on Jul. 9, 2013.

* cited by examiner

SYSTEM, METHOD, AND COMPUTER PROGRAM PRODUCT FOR SELECTING A WIRELESS NETWORK BASED ON SECURITY INFORMATION

FIELD OF THE INVENTION

The present invention relates to wireless networks, and more particularly to wireless network security.

BACKGROUND

Traditionally, security systems have been utilized for identifying and preventing unwanted activity (e.g. malware, etc.) on computer systems, networks, etc. Recently, wireless network usage has become commonplace, thus increasing the importance of security of such wireless networks. However, security systems utilized for securing wireless networks have exhibited various limitations.

Just by way of example, a device connecting to a wireless network may be unaware of a state of security of such wireless network. In this way, the device may not be informed of unwanted activity detected on the wireless network prior to connecting to the wireless network. There is thus a need for overcoming these and/or other issues associated with the prior art.

SUMMARY

A system, method, and computer program product are provided for selecting a wireless network based on security information. In use, a plurality of wireless networks is identified. Further, security information associated with each of the wireless networks is collected, such that one of the wireless networks is selected based on the security information.

DETAILED DESCRIPTION

Figure 1:
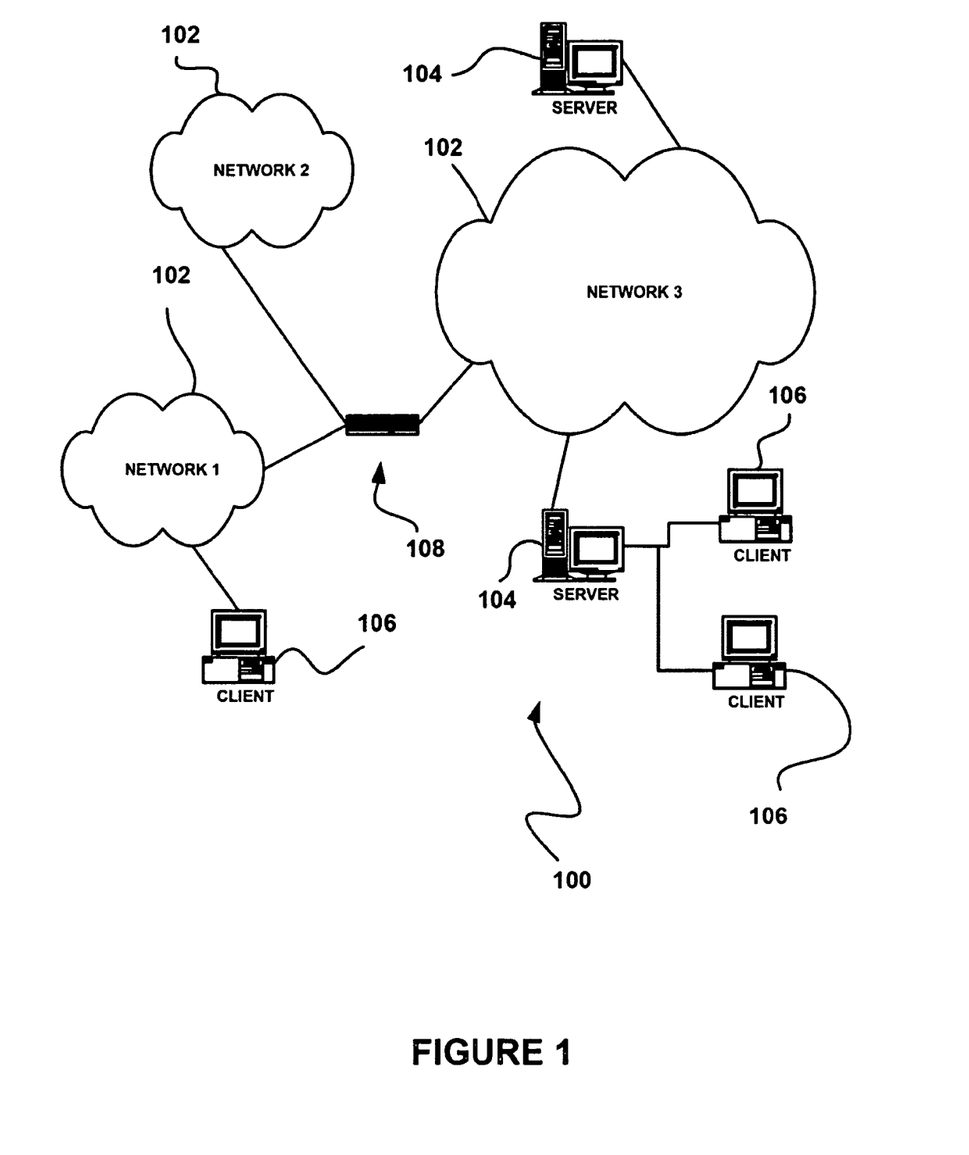
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 102, at least one gateway 108 is optionally coupled therebetween.

Figure 2:
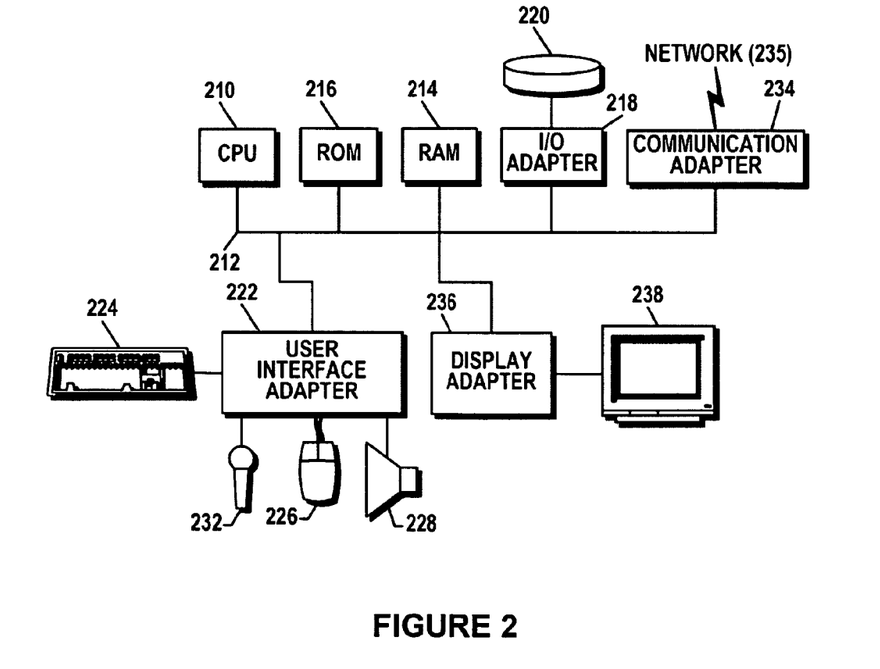
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
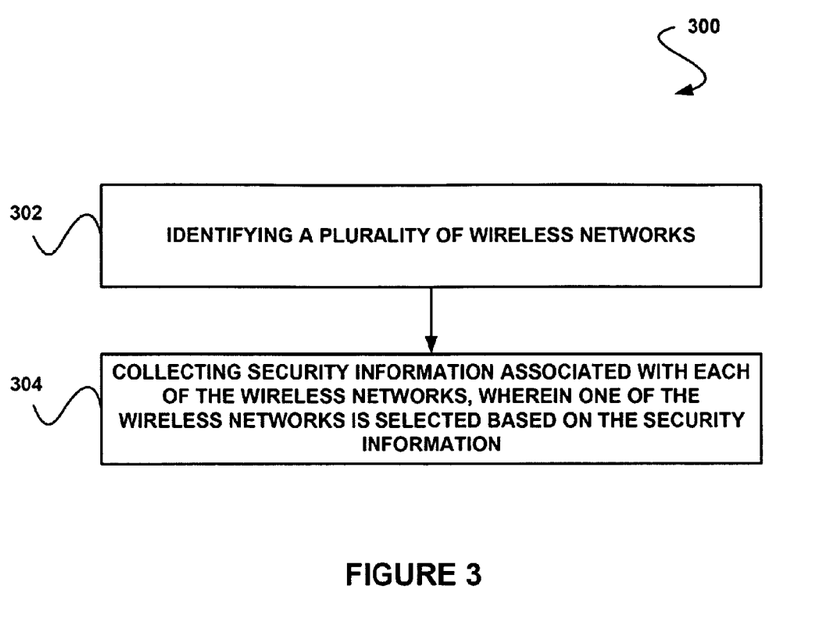
FIG. 3 shows a method for selecting a wireless network based on security information, in accordance with one embodiment.

FIG. 3 shows a method for selecting a wireless network based on security information, in accordance with one embodiment. As an option, the method 300 may be carried out in the context of the architecture and environment of FIGS. 1 and/or 2. Of course, however, the method 300 may be carried out in any desired environment.

As shown in operation 302, a plurality of wireless networks is identified. In the context of the present description, the wireless networks may include any networks capable of being connected to wirelessly. For example, the wireless networks may be capable of being connected by various devices (e.g. such as any of the devices described above with respect to FIGS. 1 and/or 2).

To this end, the wireless networks may optionally allow data to be communicated wirelessly over such wireless networks. Just by way of example, the wireless networks may include a wireless LAN. Of course, however, the wireless networks may also include any of the networks described above with respect to FIG. 1 which are capable of being connected to wirelessly.

Additionally, the wireless networks may be identified any desired manner. In one embodiment, the wireless networks may include wireless networks available to a device. Accordingly, the wireless networks may optionally be identified utilizing the device (e.g. via a signal broadcasted from the device, etc.). For example, the wireless networks may be identified utilizing an agent (e.g. of the device).

In another embodiment, the wireless networks may be identified utilizing a central server. As an option, the central server may identify the wireless networks via information received from at least one device. For example, the information may include the security information described below.

In yet another embodiment, identifying the wireless networks may include identifying any information associated with the wireless networks. Such information may include a location of each of the wireless networks, for example. As another example, the information may include an availability of each of the wireless networks.

Furthermore, as shown in operation 304, security information associated with each of the wireless networks is collected, such that one of the wireless networks is selected based on the security information. As an option, the security information may be collected by the device (e.g. an agent of the device) connected to the wireless networks. As another option, the security information may be collected by the central server. Optionally, the security information may be collected (e.g. over a network, etc.) by the central server from a plurality of agents each located on a different device.

In one embodiment, the security information may include an indication of whether unwanted activity and/or unwanted data has been detected. Such unwanted activity may include malware (e.g. a virus, a worm, port scans, etc.), execution of unidentified applications, communication of malformed packets and/or any other activity which may be determined to be unwanted. Moreover, the unwanted data may include an unidentified application, malformed packets, etc.

In addition, the unwanted activity may be detected utilizing a security system. (e.g. anti-virus scanner, firewall, etc.). For example, the security system may be located on a device on which the unwanted activity is identified. In this way, security information associated with a wireless network may optionally indicate whether unwanted activity has been detected on such wireless network.

In another embodiment, the security information may include an indication of a location of a device on which the security information is identified. The location may include the physical position of the wireless network, or an internet protocol (IP) address of the device, for example. In yet another embodiment, the security information may include an indication of an operating system of the device on which the security information is identified.

In still yet another embodiment, the security information may include a security rating of each of the wireless networks. The security rating may be based on any unwanted activity and/or unwanted data detected on an associated wireless network. Of course, it should be noted that the security information may include any information describing a security of an associated wireless network.

In one embodiment, the security information may be collected from at least one log. As an option, the log may be stored on the device. For example, the log may be generated utilizing a security system of the device. Of course, however, the security information may be collected in any desired manner.

Still yet, selecting one of the wireless networks based on the security information may include selecting one of the wireless networks associated with security information indicating detection of a least amount of unwanted activity. Thus, a wireless network for which the least amount of unwanted activity has been detected may be selected. As another option, one of the wireless networks may be selected based on a security rating for each of the wireless networks included in the security information. For example, a wireless network indicated as being the most secure by the security ratings may be selected. Of course, however, any one of the wireless networks may be selected in any manner that is based on the security information.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
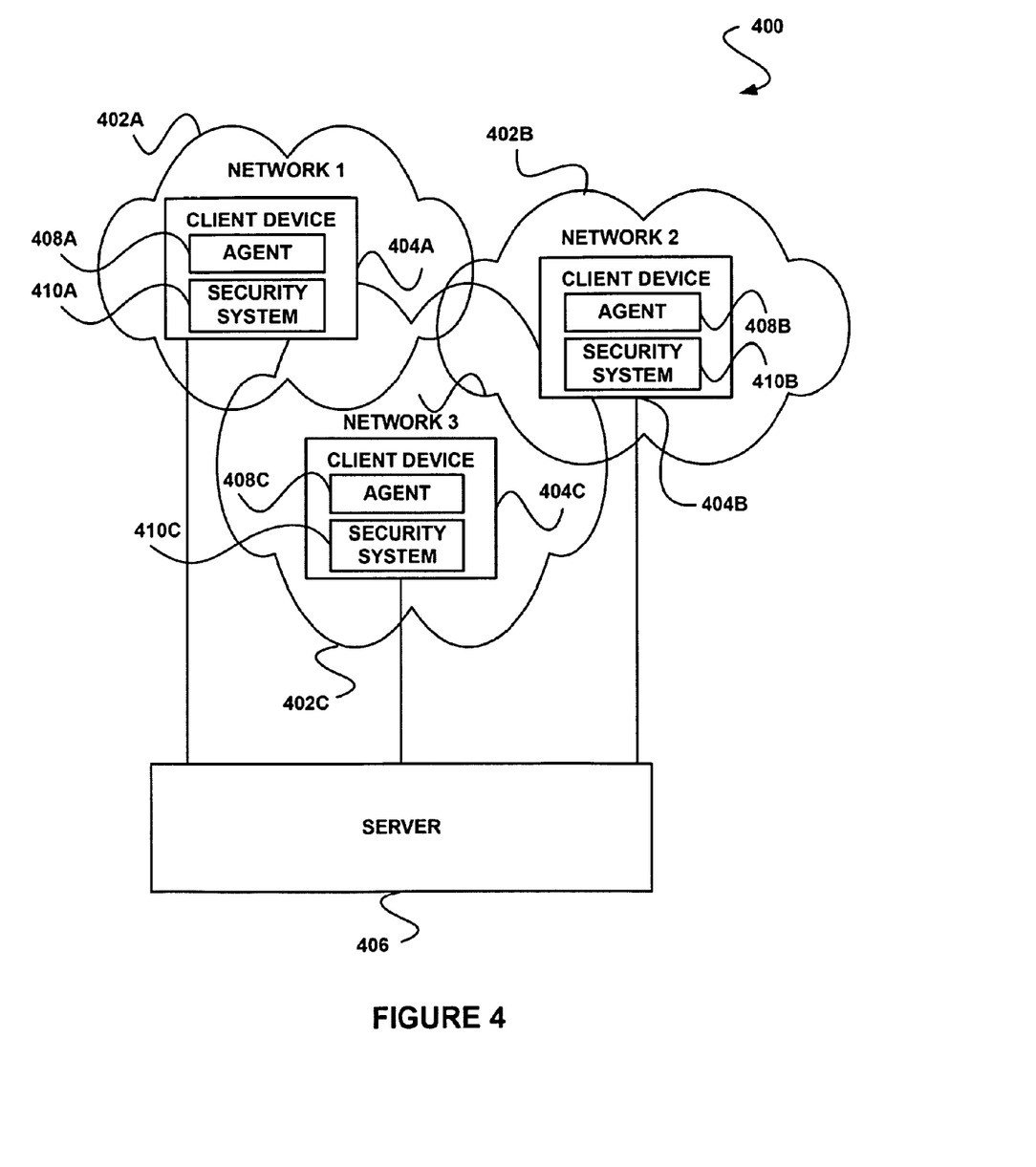
FIG. 4 shows a system for selecting a wireless network based on security information, in accordance with another embodiment.

FIG. 4 shows a system 400 for selecting a wireless network based on security information, in accordance with another embodiment. As an option, the system 400 may be implemented in the context of the architecture and environment of FIGS. 1-3. Of course, however, the system 400 may be implemented in any desired environment. It should also be noted that the aforementioned definitions may apply during the present description.

As shown, a plurality of client devices 404A-C are each located in a plurality of wireless networks 402A-C. In one embodiment, the client devices 404A-C may be connected to any of the associated wireless networks 402A-C, but of course any of such wireless networks 402A-C may also only be available for connection by the client devices 404A-C.

Each of the client devices 404A-C respectively includes an agent 408A-C and a security system 410A-C. In one embodiment, each of the client devices 404A-C may utilize an associated security system 410A-C to detect unwanted activity on the wireless networks 402A-C to which the client device 404A-C is connected. For example, the security systems 410A-C may scan, filter, etc. data received from the wireless networks 40-2A-C for detecting the unwanted activity. Additionally, the security systems 410A-C may log information indicating the detected unwanted activity, a time of diction of the unwanted activity, etc. in a log stored on a respective client device 404A-C.

In another embodiment, the agent 408A-C of each of the client devices 404A-C may utilize the information in the log for collecting security information associated with the wireless networks 402A-C to which the associated client device 404A-C is connected. For example, the security information may include a wireless network on which the unwanted activity was detected. Thus, based on unwanted activity indicated in the log, the agent 408A-C may identify the wireless network 402A-C on which the unwanted activity was detected.

Just by way of example, the agent may identify the wireless network 402A-C on which the unwanted activity was detected by correlating a time the unwanted activity was detected, as indicated in the log, with a wireless network to which the client device 404A-C was connected at such time. Of course, however, the agent 408A-C may identify the wireless network 402A-C on which the unwanted activity was detected in any desired manner.

As another example, the security information may include a location (e.g. physical location of wireless network, IP address, etc.) of the client device 404A-C which detected the unwanted activity. As yet another example, the security information may include an operating system of the client device 404A-C which detected the unwanted activity. As another example, the security information may include any of the information included in the log, such unwanted activity detected, a time in which such unwanted activity was detected, etc.

In another embodiment, the agent 408A-C of each of the client devices 404A-C may communicate the security information gathered by such agent 408A-C to a server 406. Such server may include a central server, as an option. As another option, the security information may be communicated to the server 406 via a predetermined network (e.g. a secure network, etc.). For example, as shown, the server 406 may receive security information from each of the client devices 404A-C. In this way, the server 406 may collect security information associated with each of the wireless networks 402A-C.

In one embodiment, the security information may be communicated to the server 406 from the client devices 404A-C at random time intervals. Thus, the security information associated with the wireless networks 402A-C may optionally include real-time security information associated with a current security of the wireless networks 402A-C.

In response to receipt of the security information by the server 406, the server 406 may analyze the security information. For example, the server may utilize the security information associated with each wireless network 402A-C for determining whether an attack (e.g. a threshold amount of unwanted activity, etc.) has occurred on each of the wireless networks 402A-C. In another example, the server may utilize the security information associated with each wireless network 402A-C for rating each of the wireless network 402A-C (e.g. according to a predefined scale, etc.). The rating may indicate a level of security of a wireless network 402A-C, as an option. Of course, however, any desired type of analysis may be performed on the security information.

Moreover, the server 406 may store results of the analysis of the security information. In one embodiment, the results may indicate a security state of each of the wireless networks 402A-C. For example, the results may indicate whether the wireless networks 402A-C are secure or have been attacked with unwanted activity. In another embodiment, the results may indicate the rating for each of the wireless networks 402A-C.

Further, the server 406 may communicate the results of the analysis of the security information to any of the client devices 404A-C requesting the results. For example, in response to one of the client devices 404A-C sending a request to the server 406 for security information associated with wireless networks 402A-C available to such client device 404A-C, the server 406 may send to the client device 404A-C results of an analysis of security information associated with the wireless networks 402A-C available to the client device 404A-C.

In one embodiment, providing the results to the requesting client device 404A-C may include displaying to a user of the requesting client device 404A-C a rating of each of the wireless networks 402A-C available to such client device 404A-C. Optionally, each rating may be displayed via a graph or any other suitable pictorial representation of the security state of the wireless networks. In another embodiment, a user of the requesting client device 404A-C may select one of the available wireless networks 402A-C for initiating a connection thereto. Thus, in response to selection of one of the available wireless networks 402A-C, the client device 404A-C may connect to the selected wireless network 402A-C. In this way, a client device 404A-C may connect to a wireless network 402A-C based on security information associated with such wireless network 402A-C.

Figure 5A:
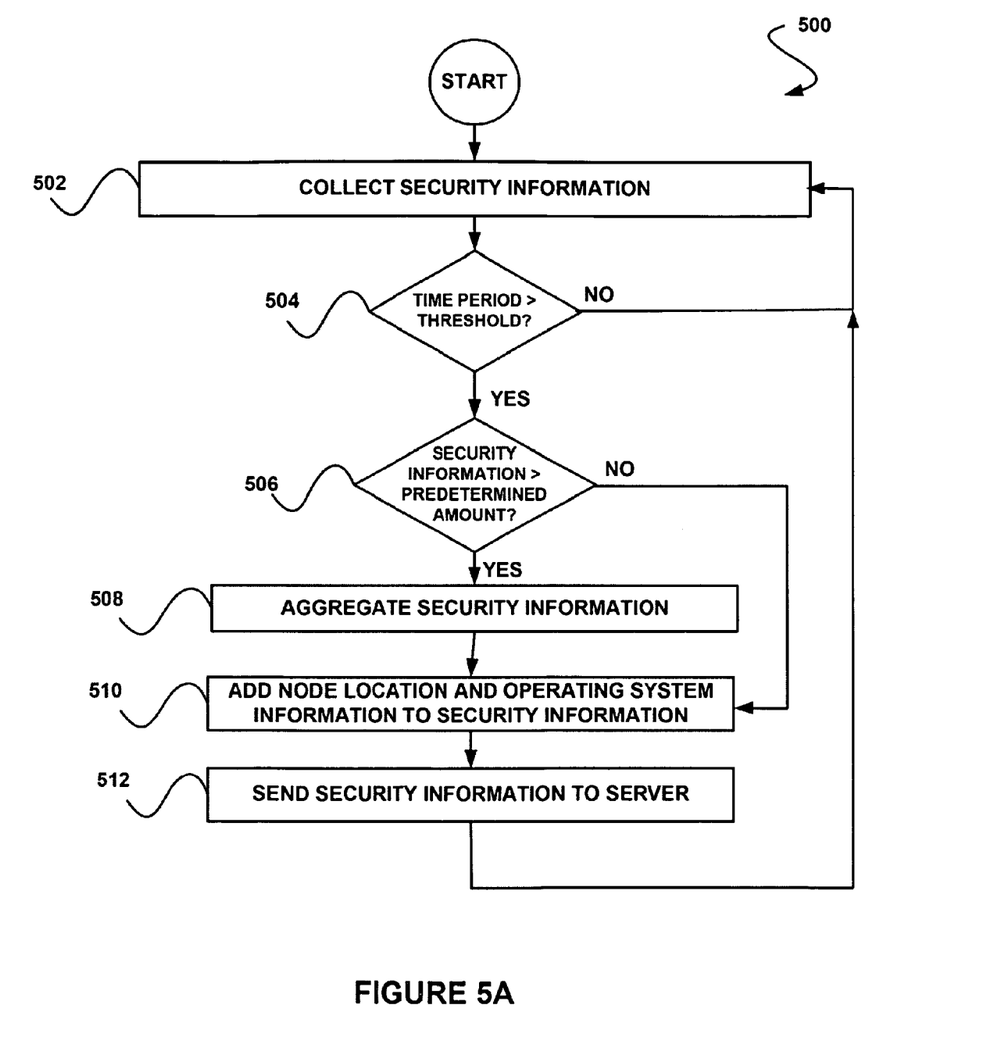
FIG. 5A shows a method for sending security information to a server, in accordance with yet another embodiment.

FIG. 5A shows a method 500 for sending security information to a server, in accordance with yet another embodiment. As an option, the method 500 may be carried out in the context of the architecture and environment of FIGS. 1-4. Just by way of example, the method 500 may be carried out utilizing the agent 408A-C of the client device 404A-C described with respect to FIG. 4. Of course, however, the method 500 may be carried out in any desired environment. Again, it should be noted that the aforementioned definitions may apply during the present description.

As shown in operation 502, security information is collected. In one embodiment, the security information may be collected from a log generated by a security system. Just by way of example, the log may indicate unwanted activity detected utilizing the security system.

In addition, it is determined whether a time period is greater than a threshold time period, as shown in decision 504. The threshold time period may include any predetermined time period (e.g. predetermined by a user, etc.). In the context of the present embodiment, the time period may be a period since previously collected security information was last communicated to a server by an agent which collected the security information. As an option, the predetermined time period may be based on an amount of network load capable of being handled in association with communicating the information and/or a time period capable of allowing an analysis of the security information to be performed in real time.

If it is determined that the time period is not greater than the threshold time period, additional security information is collected (operation 502). If, however, it is determined that the time period is greater than the threshold time period, it is determined whether the security information includes a predetermined amount of security information. Note decision 506. The predetermined amount of security information may be configured by a user, for example. Optionally, a size of the collected security information and a size indicated by the predetermined amount of security information may be compared for determining whether the security information includes a predetermined amount of security information.

In response to a determination that the security information includes the predetermined amount of security information, the security information is aggregated, as shown in operation 508. Such aggregation may include, but not limited to, generating a summary of the security information, merging duplicate security information, etc. In this way, a size of the security information may be reduced.

Once the security information is aggregated, or in another embodiment in response to a determination that the security information does not include the predetermined amount of security information, a node location and operating system information are added to the security information. Note operation 510. The node location may include a location of a device on which the security information is collected. For example, the location may include a wireless network on which the device is located. In addition, the operating system information may include the operating system utilized by the device on which the security information is collected. Optionally, services running on the node and/or applications installed on the node may also be added to the security information.

Furthermore, the security information is sent to a server, as shown in operation 512. It should be noted that the security information may be sent to the server in any desired manner. In one embodiment, the security information may be sent to the server utilizing a predetermined network (e.g. a secure network). In another embodiment, the security information may be sent to the server using a wireless network to which the associated device is currently connected.

Figure 5B:
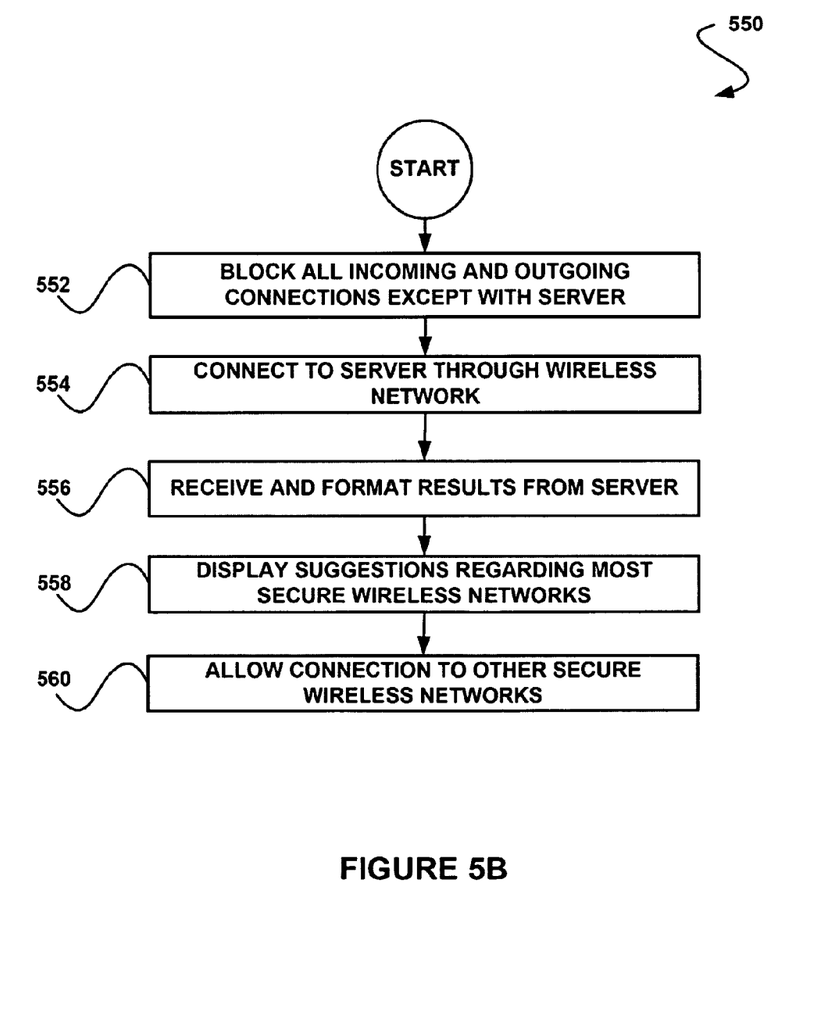
FIG. 5B shows a method for allowing a connection to secure wireless networks, in accordance with still yet another embodiment.

FIG. 5B shows a method 550 for allowing a connection to secure wireless networks, in accordance with still yet another embodiment. As an option, the method 550 may be carried out in the context of the architecture and environment of FIGS. 1-3. Just by way of example, the method 550 may be carried out utilizing the client device 404A-C described with respect to FIG. 4. Of course, however, the method 550 may be carried out in any desired environment. Again, it should be noted that the aforementioned definitions may apply during the present description.

As shown in operation 552, all incoming and outgoing connection are blocked except for a connection with a server. Optionally, the connection with the server may include a secure connection. In one embodiment, the incoming and outgoing connections may be blocked by setting a maximum security level (e.g. rule) for an associated device utilizing a security system of such device.

In another embodiment, the connection with the server may be allowed by setting an exception to the maximum security level for such server. In this way, unsecured network communications may be prevented from being sent and/or received. Additionally, the server is connected to through a wireless network, as shown in operation 554. As noted above, the wireless network utilized for connecting the server may include a secure wireless network.

Further, as shown in operation 556, results from the server are received and formatted. In the context of the present embodiment, the results may include results of an analysis of security information associated with wireless networks available to the device. For example, the results may include a security rating for each wireless network capable of being connected to by the device.

In one embodiment, the results may be formatted by creating a graph of the results. In another embodiment, the results may be formatted by creating a pictorial representation of the results. In yet another embodiment, formatting the results may include selecting wireless networks indicated by the results to be the most secure (e.g. to have the least amount of detections of unwanted activity, etc.). Of course, however, the results may be formatted in any desired manner.

Moreover, suggestions regarding the most secure wireless networks that are available to be connected to are displayed. Note operation 558. The most secure wireless networks may be determined based on the results received from the server. Optionally, the suggestions may include a list of the names of the most secure wireless networks. As another option, the suggestions may indicate the security rating for each of the most secure wireless networks.

Still yet, as shown in operation 560, a connection to other secure wireless networks is allowed. For example, a connection to any of the most secure wireless networks suggested may be allowed. In one embodiment, allowing the connection may include displaying options to a user of the device to connect to any of such other secure wireless networks. The options may be displayed with the suggestions displayed in operation 558, for example. Of course, however, a user of the device may also select to remain disconnected to the other secure wireless networks, and thus remain connected to the secure network utilized for communicating with the server. In another embodiment, remaining connected to such secure network may include resetting a default security state of the security system of the device, thus removing the setting for the maximum security level for the device optionally set in operation 552.

Figure 6A:
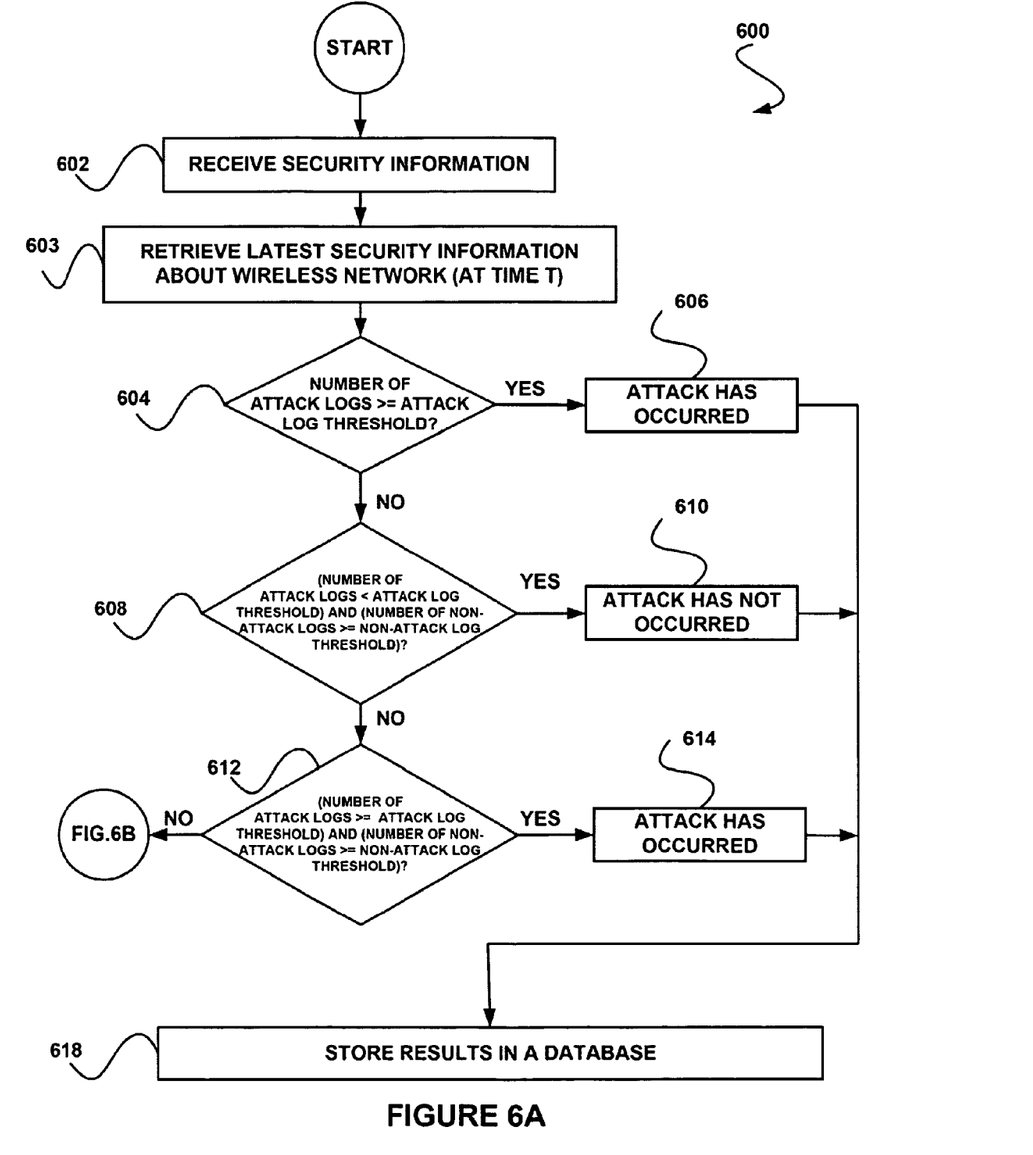
FIGS. 6A-B show a method for determining whether an attack has occurred on a wireless network, in accordance with another embodiment.
Figure 6B:
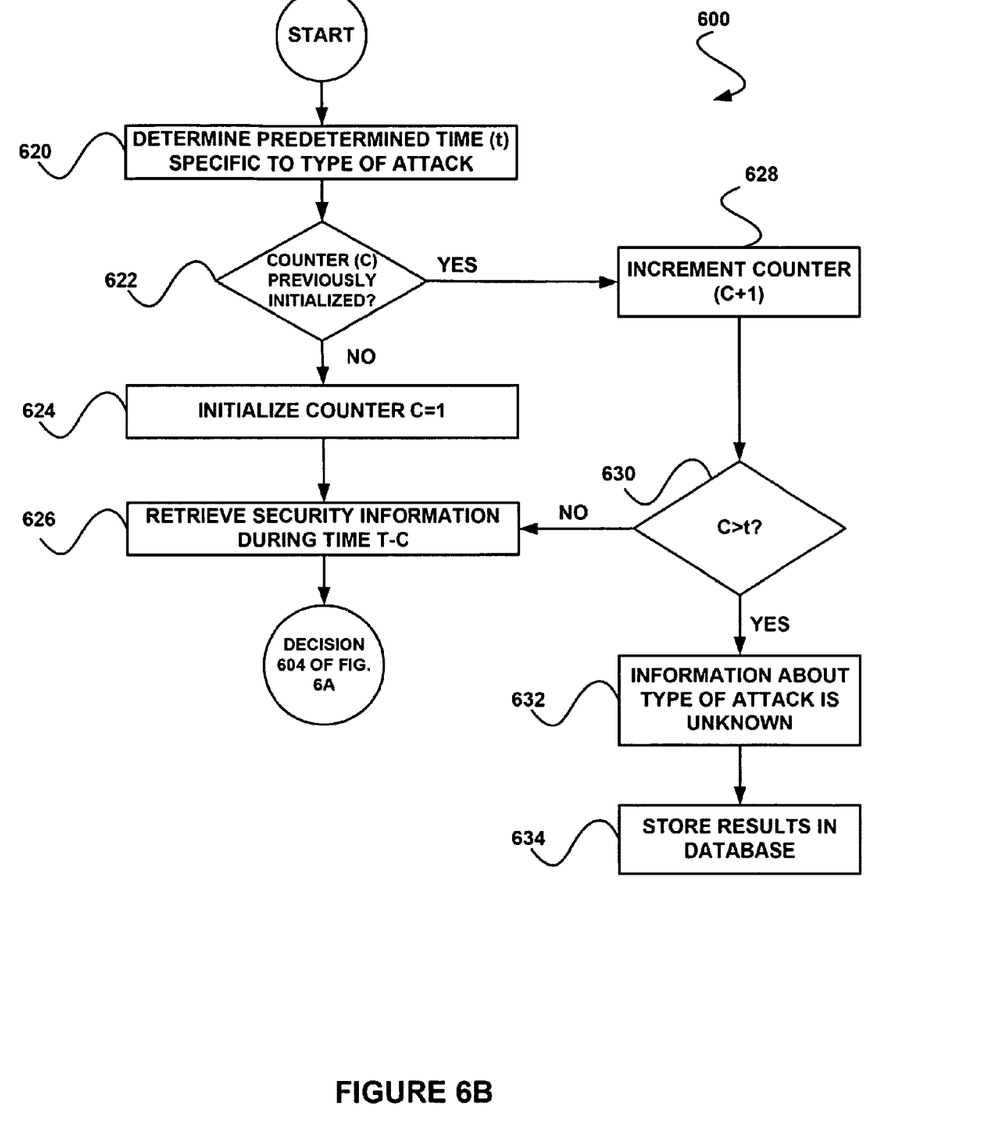

FIGS. 6A-B show a method 600 for determining whether an attack has occurred on a wireless network, in accordance with another embodiment. As an option, the method 600 may be carried out in the context of the architecture and environment of FIGS. 1-5B. Just by way of example, the method 600 may be carried out utilizing the server 406 described with respect to FIG. 4. Of course, however, the method 600 may be carried out in any desired environment. Yet again, it should be noted that the aforementioned definitions may apply during the present description.

As shown in operation 602, security information is received. In the context of the present embodiment, the security information may be associated with one wireless network. Optionally, the security information may be received from an agent of a device connected to the wireless network. Optionally, the security information may be stored in a database in response to receipt of the security information.

In addition, latest security information about the wireless network is retrieved, as shown in operation 603. In one embodiment, the latest security information may be retrieved from the database storing the received security information. Thus, most recently received security information may be retrieved from the database, as an option.

Furthermore, it is determined whether a number of attack logs indicated by the retrieved security information is greater than or equal to an attack log threshold. Note decision 604. The attack log threshold may be configured by a user, as an option. In addition, the attack log threshold may be based on a type of unwanted activity, such that different types of unwanted activity may be associated with different attack log thresholds.

Thus, in the context of the present embodiment, a number of logs (e.g. instances, etc.) of detected unwanted activity included in the security information may be identified and compared to the attack log threshold. Optionally, the number of attack logs may include a number of logs of detected unwanted activity of a same type.

If it is determined that the number of attack logs indicated by the retrieved security information is greater than or equal to an attack log threshold, it is determined that an attack has occurred on the wireless network, as shown in operation 606. For example, it may be determined that an attack of the same type indicated by the attack logs included in the retrieved security information has occurred in the wireless network.

If, however, it is determined that the number of attack logs indicated by the retrieved security information is not greater than or equal to an attack log threshold, it is further determined whether the number of attack logs is less than the attack log threshold and whether a number of non-attack logs is greater than or equal to a non-attack log threshold. Note decision 608. In one embodiment, the non-attack log threshold may be configured by a user. In another embodiment, the non-attack log threshold may be based on a type of unwanted activity, such that different types of unwanted activity may be associated with different non-attack log thresholds. In yet another embodiment, the non-attack logs may include logs of activity included in the retrieved security information that were not determined to be unwanted.

If it is determined that the number of attack logs is less than the attack log threshold and that the number of non-attack logs is greater than or equal to the non-attack log threshold, it is determined that an attack has not occurred. Note operation 610. For example, it may be determined that an attack of the same type indicated by the attack logs included in the retrieved security information has not occurred in the wireless network.

However, if it is determined that the number of attack logs is not less than the attack log threshold or that the number of non-attack logs is not less than the non-attack log threshold, it is determined whether the number of attack logs is greater than or equal to the attack log threshold and whether the number of non-attack logs is greater than or equal to the non-attack log threshold. Note decision 612. In response to a determination that the number of attack logs is greater than or equal to the attack log threshold and that the number of non-attack logs is greater than or equal to the non-attack log threshold, it is determined that an attack has occurred, as shown in operation 614.

Based on a determination in operation 606 or 614 that an attack has occurred, or a determination in operation 610 that an attack has not occurred, such determinations are stored as results in a database. Note operation 618. If it is determined in decision 612 that the number of attack logs is not greater than or equal to the attack log threshold or that the number of non-attack logs is not greater than or equal to the non-attack log threshold, a predetermined time (t) specific to the type of attack indicated in the attack logs of the security information is determined. Note operation 620. The time may include a time period predetermined by a user, for example.

Still yet, it is determined whether a counter (C) has previously been initialized, as shown in decision 622. The counter may include any incremental counter. In addition, the determination may be based on a flag associated with the counter. For example, the flag may be set when the counter is initialized.

If it is determined that that the counter was not previously initialized, the counter is initialized to the value "1", as shown in operation 624. Of course, it should be noted that the counter may be initialized to any desired value. Further, security information stored in the database during the time period between the time (T) the security information was retrieved in operation 603 and the time (T-C) specific to the type of attack is retrieved. Note operation 626. In this way, previously stored security information may be retrieved from the database. Further, it is again determined, based on such newly retrieved security information, whether at attack has occurred (see operations 604-614).

If it is determined that the counter (C) was previously initialized, the counter is incremented, as shown in operation 628. Just by way of example, the counter may be incremented by 1. Moreover, it is determined whether the counter is larger than the predetermined time (t). Note decision 630. If the counter is not greater than the predetermined time, security information stored in the database during the time period between the time (T) the security information was retrieved in operation 603 and the time (T-C) specific to the type of attack is retrieved (operation 626).

If, however, the counter (C) is greater than the predetermined time (t), it is determined that information about the type of attack indicated in the security information is unknown. Note operation 632. Such information indicating the unknown status of the attack logs is stored as results in the database, as shown in operation 634. Optionally, the method 600 may be performed for each type of attack indicated in the attack logs included in the security information for a wireless network.

Figure 7:
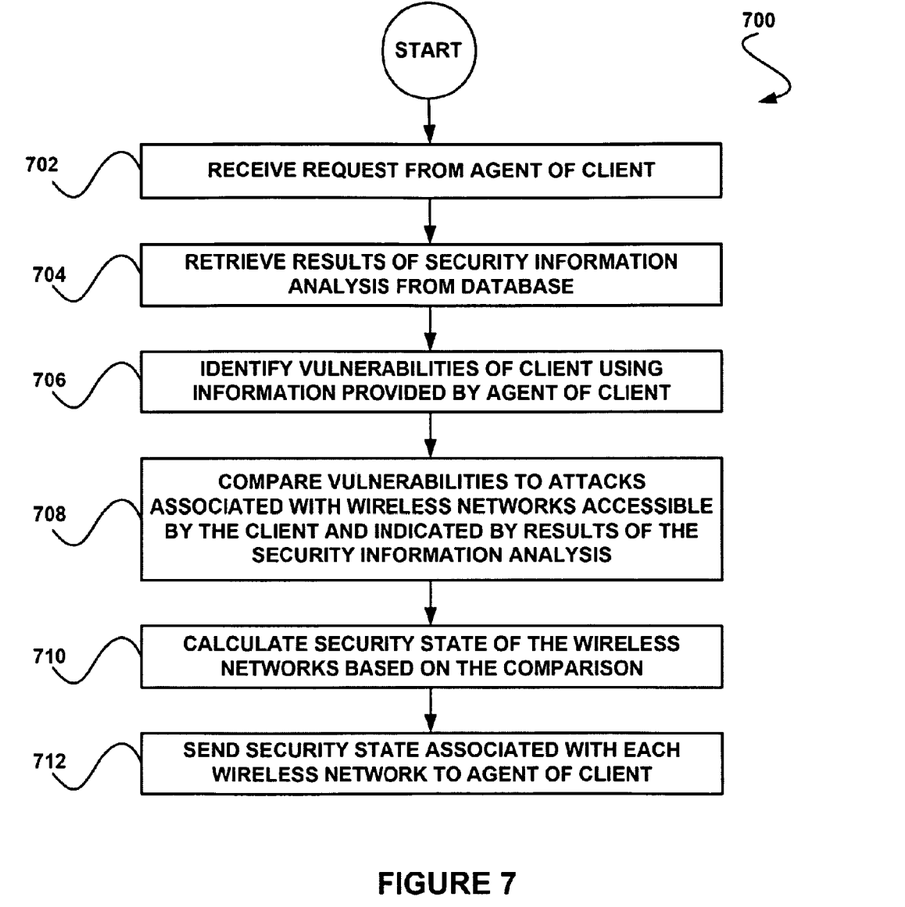
FIG. 7 shows a method for sending a security state associated with each accessible wireless network to an agent of a client, in accordance with yet another embodiment.

FIG. 7 shows a method 700 for sending a security state associated with each accessible wireless network to an agent of a client, in accordance with yet another embodiment. As an option, the method 700 may be carried out in the context of the architecture and environment of FIGS. 1-6B. Just by way of example, the method 700 may be carried out utilizing the server 406 described with respect to FIG. 4. Of course, however, the method 700 may be carried out in any desired environment. Yet again, it should be noted that the aforementioned definitions may apply during the present description.

As shown in operation 702, a request is received from an agent of a client. In the context of the present embodiment, the request may include a request for security states associated with each of a plurality of wireless networks to which the client may connect. For example, the agent of the client may request the security states such that a user of the client may utilize the security states in selecting to which wireless network the client is to connect.

Additionally, results of an analysis of security information are retrieved from a database, as shown in operation 704. Optionally, the results may include a determination of a number of different types of attacks that occurred in each of the wireless networks. For example, the database may store a determination for each type of attack logged in the security information associated with a wireless network of whether such attack occurred in the wireless network.

Further, as shown in operation 706, vulnerabilities of the client are identified utilizing information provided by the agent of the client. In the context of the present embodiment, the vulnerabilities may include any susceptibilities of the client to unwanted activity. The information provided by the client may include an operating system utilized by the client, applications installed on the client, security systems located on the client, etc.

Optionally, characteristics of the client may be determined based on the information provided by the agent of the client, and such characteristics may be compared to characteristics of known vulnerabilities. A match between the characteristics of the client and characteristics of a known vulnerability may indicate a vulnerability of the client. Of course, however, vulnerabilities of the client may be identified in any manner.

Moreover, the client vulnerabilities are compared to attacks associated with the wireless networks accessible by the client and indicated by results of the security information analysis. Note operation 708. In this way, attacks capable of exploiting any of the vulnerabilities of the client and that have been detected in any of the wireless networks may be determined.

Still yet, a security state of each of the wireless networks is calculated based on the comparison, as shown in operation 710. In one embodiment, the security state may include a rating for a wireless network. Such rating may be based on a predetermined scale.

In addition, the security state may be calculated in any desired manner. For example, each type of attack associated with a wireless network that is capable of exploiting a vulnerability of the client may be associated with a predefined weight. In this way, the weights of all of the types of attacks associated with the wireless network that are capable of exploiting at least one vulnerability of the client may be aggregated for calculating the security state.

As also shown, the security state associated with each wireless network is sent to the agent of the client. Note operation 712. Optionally, the security states may be sent to the agent of the client via a secure network. To this end, the agent of the client may be informed of a security state for each wireless network capable of being connected to by the client.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method implemented by an apparatus, the method comprising:
receiving a request, from a first client device, identifying one of a plurality of wireless networks;
collecting security information associated with the one of the wireless networks from a second client device, wherein the security information includes an indication of an operating system of the second client device;
receiving an indication of an operating system utilized by the first client device to identify a vulnerability of the first client device;
determining, with the apparatus, a security state of the one of the wireless networks based, at least in part, on the vulnerability and the security information; and
sending the security state for the one of the wireless networks to the first client device.

2. The method of claim 1, wherein the second client device identifies the one of the plurality of wireless networks via a broadcasted signal.

3. The method of claim 1, wherein the apparatus is a central server.

4. The method of claim 1, wherein the security information includes an indication of whether malware, an unidentified application, or a malformed packet has been detected.

5. The method of claim 4, wherein the malware, the unidentified application, or the malformed packet is detected using a security system that comprises an anti-virus scanner.

6. One or more non-transitory, computer-readable storage media storing instructions that, when executed, cause a method to be performed, the method comprising:
receiving a request, from a first client device, identifying one of a plurality of wireless networks;
collecting security information associated with the one of the wireless networks from a second client device, wherein the security information includes an indication of an operating system of the second client device;
receiving an indication of an operating system utilized by the first client device to identify a vulnerability of the first client device;
determining a security state of the one of the wireless networks based, at least in part, on the vulnerability and the security information; and
sending the security state for the one of the wireless networks to the first client device.

7. The one or more computer-readable storage media of claim 2, wherein the method is performed by a central server.

8. The one or more computer-readable storage media of claim 6, wherein the security information includes an indication of whether malware, an unidentified application, or a malformed packet has been detected.

9. The method of claim 1, wherein the one of the wireless networks is selected based, at least in part, on a least amount of malware, unidentified applications, or malformed packets detected on the one of the wireless networks.

10. The one or more computer-readable storage media of claim 6, the method further comprising:
determining whether malware, an unidentified application, or a malformed packet occurred on the one of the plurality of wireless networks, based, at least in part, on the security information.

11. The one or more computer-readable storage media of claim 6, wherein the security information includes an indication of a location of the second client device.

12. The method of claim 1, further comprising:
connecting the first client device to the one of the wireless networks, based, at least in part, on the security state.

13. The one or more computer-readable storage media of claim 6, the method further comprising:
generating a rating for the one of the wireless networks, and providing the rating to the first client device.

14. A server, comprising:
a processor; and
a memory coupled to the processor, wherein the server is configured to
receive a request, from a first client device, to identify one of a plurality of wireless networks;
collect security information associated with the one of the wireless networks from a second client device, wherein the security information includes an indication of an operating system of the second client device;
receive an indication of an operating system utilized by the first client device to identify a vulnerability of the first client device;
determine a security state of the one of the wireless networks based, at least in part, on the vulnerability and the security information; and
send a security state for the one of the wireless networks to the first client device.

15. The server of claim 14, wherein the security information includes an indication of whether malware, an unidentified application, or a malformed packet has been detected.

16. The server of claim 14, wherein the server is configured to determine whether malware, an unidentified application, or a malformed packet occurred on the one of the plurality of wireless networks, based, at least in part, on the security information.

17. The server of claim 14, wherein the security information includes an indication of a location of the second client device.

18. The one or more computer-readable storage media of claim 6, the method further comprising:
determining whether a number of attack logs is greater than or equal to a predetermined threshold.

19. The one or more computer-readable storage media of claim 6, the method further comprising:
determining whether a number of non-attack logs is greater than or equal to a predetermined threshold.

20. The one or more computer-readable storage media of claim 6, wherein the security information includes an indication of an application installed on the second device.

21. The server of claim 14, wherein the server is configured to generate a rating for the one of the wireless networks, and to provide the rating to the first client device.

22. The server of claim 14, wherein the server is configured to determine whether a number of attack logs is greater than or equal to a predetermined threshold.

23. The server of claim 14, wherein the server is configured to determine whether a number of non-attack logs is greater than or equal to a predetermined threshold.

24. The server of claim 14, wherein the security information includes an indication of an application installed on the second device.

* * * * *

UNITED STATES PATENT AND TRADEMARK OFFICE
CERTIFICATE OF CORRECTION

| | | |
|---|---|---|
| PATENT NO. | : 8,966,638 B2 | Page 1 of 1 |
| APPLICATION NO. | : 13/974188 | |
| DATED | : February 24, 2015 | |
| INVENTOR(S) | : Sankha S. Dey | |

It is certified that error appears in the above-identified patent and that said Letters Patent is hereby corrected as shown below:

In the Claims,

In column 11, line 47, in Claim 7, after "claim" delete "2" and insert -- 6 -- therefor.

Signed and Sealed this
Nineteenth Day of May, 2015

Michelle K. Lee
*Director of the United States Patent and Trademark Office*